United States Patent
Blasczyk et al.

(10) Patent No.: US 12,480,093 B2
(45) Date of Patent: Nov. 25, 2025

(54) PRODUCTION OF MEGAKARYOCYTES IN BIOREACTORS

(71) Applicant: MEDIZINISCHE HOCHSCHULE HANNOVER, Hannover (DE)

(72) Inventors: Rainer Blasczyk, Isernhagen (DE); Constanca Ferreira De Figueiredo, Neustadt am Rubenberge (DE)

(73) Assignee: Medizinische Hochschule Hannover, Hannover (DE)

( * ) Notice: Subject to any disclaimer, the term of this patent is extended or adjusted under 35 U.S.C. 154(b) by 869 days.

(21) Appl. No.: 17/046,850

(22) PCT Filed: May 2, 2019

(86) PCT No.: PCT/EP2019/061263
§ 371 (c)(1),
(2) Date: Oct. 12, 2020

(87) PCT Pub. No.: WO2019/211383
PCT Pub. Date: Nov. 7, 2019

(65) Prior Publication Data
US 2021/0371824 A1 Dec. 2, 2021

(30) Foreign Application Priority Data

May 3, 2018 (EP) .................................... 18170657

(51) Int. Cl.
*C12N 5/078* (2010.01)
*A61K 35/19* (2015.01)

(52) U.S. Cl.
CPC ............ *C12N 5/0644* (2013.01); *A61K 35/19* (2013.01); *C12N 2501/125* (2013.01); *C12N 2501/145* (2013.01); *C12N 2501/155* (2013.01); *C12N 2501/165* (2013.01); *C12N 2501/2303* (2013.01); *C12N 2506/45* (2013.01); *C12N 2531/00* (2013.01); *C12N 2533/30* (2013.01); *C12N 2533/52* (2013.01)

(58) Field of Classification Search
CPC ............ C12N 5/0644; C12N 2501/125; C12N 2501/145; C12N 2501/155; C12N 2501/165; C12N 2501/2303; C12N 2506/45; C12N 2531/00; C12N 2533/30; C12N 2533/52; A61K 35/19
See application file for complete search history.

(56) References Cited

U.S. PATENT DOCUMENTS

2012/0028352 A1 2/2012 Oh et al.
2012/0238020 A1 9/2012 Mitchell et al.

OTHER PUBLICATIONS

Chen et al. Characterization and transplantation of induced megakaryocytes from hematopoietic stem cells for rapid platelet recovery by a two-step serum-free procedure. Experimental Hematology. 2009;37:1330-1339. (Year: 2009).*
Feng et al. Stem Cell Reports. 2014;3:817-831. (Year: 2014).*
Lam et al. Stem Cell Research & Therapy. 2014; 5:110, p. 1-15. (Year: 2014).*
Chen et al. Stem Cell Research. 2011; 7: 97-111. (Year: 2011).*
Treleaven et al. British Journal of Haematology, 2010;152: 35-51. (Year: 2010).*
Altaie et al. World J Stem Cells. 2016; 8(2): 47-55. (Year: 2016).*
Reuveny et al. DE-52 and DE-53 cellulose microcarriers. In Vitro—Plant vol. 18, pp. 92-98 (1982) (Year: 1982).*
Sugimoto et al. Generation and manipulation of human iPSC-derived platelets. Cellular and Molecular Life Sciences. 2021; 78:3385-3401. (Year: 2021).*
Reems et al., "In Vitro Megakaryocyte Production and Platelet Biogenesis: State of the Art", Transfus Med Rev., Jan. 2010, pp. 33-43, vol. 24, No. 1, National Institutes of Health.
Börger et al., "Generation of HLA-Universal iPSC-Derived Megakaryocytes and Platelets for Survival Under Refractoriness Conditions", Molecular Medicine, 2016, pp. 274-285, vol. 22, Feinstein Institute for Medical Research.
Sivalingam et al., "Superior Red Blood Cell Generation from Human Pluripotent Stem Cells Through a Novel Microcarrier-Based Embryoid Body Platform", Tissue Engineering: Part C, 2016, pp. 765-780, vol. 22, No. 8, Tissue Engineering & Regenerative Medicine International Society.
Baigger et al., "Towards the Manufacture of Megakaryocytes and Platelets for Clinical Application", Transfusion Medicine and Hemotherapy, 2017, pp. 165-173, vol. 44, Karger GmbH, Freiburg.
Chen-Wacker et al., "In Vitro Differentiation of Red Blood Cells From Induced Pluripotent Stem Cells as Alternative Resource for Transfusion and a Model for Gene Therapy", Cytotherapy, May 1, 2017, vol. 19, No. 5, International Society for Cell and Gene Therapy.
Sugimoto et al., "Platelet production from induced pluripotent stem cells", Journal of Thrombosis and Haemostasis, 2017, pp. 1717-1727, vol. 15, International Society on Thrombosis and Haemostasis.
Lu et al., "3D microcarrier system for efficient differentiation of human induced pluripotent stem cells into hematopoietic cells without feeders and serum", Regenerative Medicine, Jul. 2013, vol. 8, No. 4, Future Medicine.
Lock et al., "Expansion and Differentiation of Human Embryonic Stem Cells to Endoderm Progeny in Microcarrier Stirred-Suspension Culture", Tissue Engineering: Part A, 2009, pp. 2051-2063, vol. 15, No. 8, Mary Ann Liebert, Inc.
International Search Report and Written Opinion from the corresponding International Patent Application No. PCT/EP2019/061263, dated Jun. 12, 2019.

* cited by examiner

Primary Examiner — James D Schultz
Assistant Examiner — Jianjian Zhu
(74) Attorney, Agent, or Firm — Greer, Burns & Crain, Ltd.; Steven P. Fallon; E. Kate Berezutskaya

(57) ABSTRACT

An in vitro process for producing megakaryocytes, and optionally platelets from the megakaryocytes, including the steps of cultivating stem cells, e.g. induced pluripotent stem cells, to generate aggregated pluripotent stem cells, preferably cultivating the aggregates in suspension in medium, inducing differentiation in these aggregates, and isolating megakaryocytes from the culture medium.

9 Claims, 3 Drawing Sheets

PRODUCTION OF MEGAKARYOCYTES IN BIOREACTORS

Figure 1:
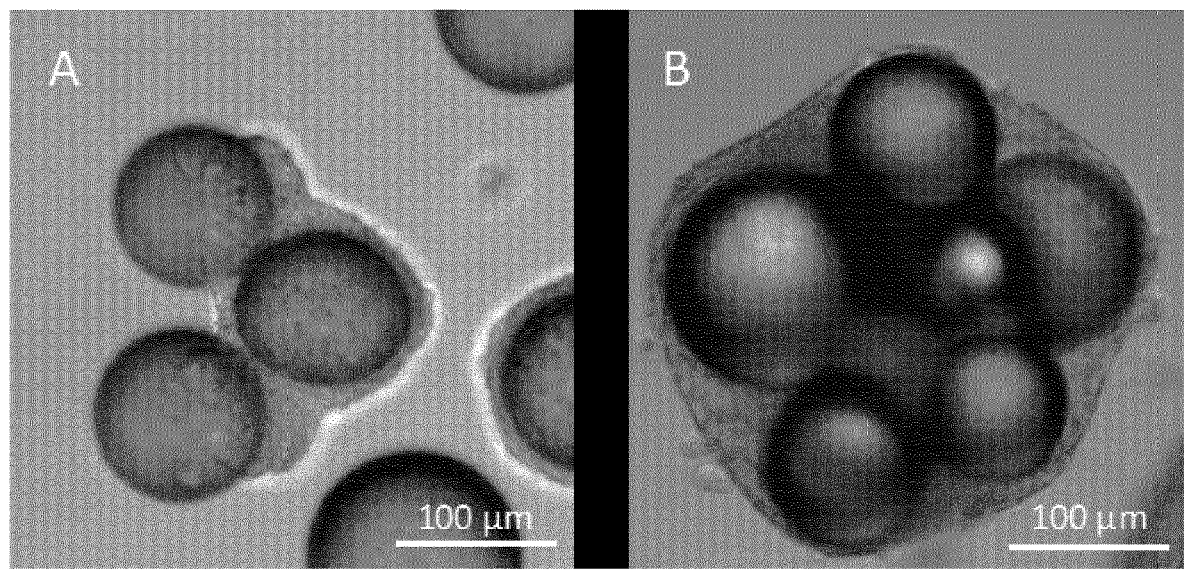

The present invention relates to an in vitro process for the production megakaryocytes, especially derived from induced pluripotent stem cells (iPSC), in a cell culture vessel equipped to provide controlled culture conditions, e.g. in an agitated bioreactor.

The production process of the invention is suitable for producing megakaryocytes for use in medical treatment, e.g. for use in the treatment of thrombocytopenia, e.g. for use in the treatment of platelet refractoriness, for use in the state of alloimmunization to HLA or human platelet antigens, in the case of pregnancy, or in a transplant patient. Optionally, a lysate can be prepared of the megakaryocytes, and the lysate is for use in the medical treatment. It was found that the administration, e.g. by infusion, of megakaryocytes produced according to the invention to a patient results in an effective generation of platelets from the megakaryocytes.

Optionally, the process for producing megakaryocytes can comprise subsequent in vitro steps for generating platelets from the megakaryocytes for use of the platelets in medical treatment, e.g. for use in the treatment of thrombocytopenia.

STATE OF THE ART

Börger et al., Mol Med 22:274-285 (2016), describe that a HLA-universal induced pluripotent stem cell (iPSC) line, designated hCBiPSC2, derived from human cord blood endothelial cells, was adapted to feeder-free and xeno-free culture by transfer onto culture plates coated with human recombinant laminin (Laminin-521, available from BioLamina). The genetic manipulation was by lentiviral transduction.

Sivalingam et al., Tissue Engineering C, 765-780 (2016), describe expansion of hPSC by cultivation on micro-carriers coated with human recombinant Laminin-521 using serum-free culture medium with agitation to suspend the hPSC-covered micro-carriers. These hPSC formed embroid bodies on the micro-carriers for subsequent erythroid differentiation and production of red blood cells (RBC).

US2012/0238020 A1 describes the production of platelets by culturing stem cells for generating megakaryocyte progenitor cells and seeding these onto bone marrow stroma cells previously grown on culture dishes to generate mature megakaryocytes, which are then isolated and cultured in a three-dimensional matrix using a specific medium with application of shear-stress for producing platelets.

US 2012/0028352 A1 describes cultivating mesenchymal stem cells, which preferably are multipotent, by allowing the stem cells to attach to micro-carrier beads having a size in the range of 50 to 400 μm in agitated suspension culture.

Reems et al., Transfus Med Rev., 24(1), 33-43 (2010), quote that CD34+ cells isolated from peripheral blood could be cultured to produce megakaryocytes, which at the peak of proplatelet formation exhibited proplatelets and platelet-sized fragments in 40% of megakaryocytes. It is described that optimization of culture conditions for stem cell self-renewal and amplification of progenitors for megakaryocytes prior to differentiation to megakaryocytes could result in yields for industrial scale production.

OBJECT OF THE INVENTION

It is an object of the invention to provide an alternative process for producing megakaryocytes, especially on the basis of induced pluripotent stem cells (iPSC), e.g. on the basis of an induced pluripotent stem cell line, in feeder cell-free and xeno-free conditions. A preferred object is that the process has a high production rate of megakaryocytes from the iPSC.

DESCRIPTION OF THE INVENTION

The invention achieves the object by the features of the claims, especially by an in vitro process for producing megakaryocytes, and optionally platelets from the megakaryocytes, comprising the steps of cultivating stem cells which are at least pluripotent, e.g. induced pluripotent stem cells, to generate aggregated pluripotent stem cells, preferably cultivating the aggregates in suspension in medium, inducing differentiation in these aggregates, and isolating megakaryocytes from the culture medium. It was found that the aggregates release megakaryocytes into the medium. The process comprises or essentially consists of the following steps:

a) Cultivating stem cells which are at least pluripotent, preferably induced pluripotent stem cells (iPSC), to generate cultivated stem cells, b) cultivating the stem cells, optionally preferably contacting the stem cells with micro-carriers, e.g. with the stem cells being suspended in cell culture medium containing the micro-carriers, preferably for a static cultivation phase, e.g. of at least 6 h or at least 12 h, preferably of at least 24 h, more preferably of 12 to 36 h, which micro-carriers can be non-porous, and which micro-carriers preferably are coated with a protein promoting adherent growth, which is e.g. recombinantly produced human laminin or fibronectin, to generate aggregates comprising or consisting of stem cells and optional micro-carriers, c) cultivating the aggregates comprising or consisting of stem cells and optional micro-carriers in suspension in medium with agitation to produce cultivated stem cell aggregates or cultivated aggregates of stem cells and optional micro-carrier, d) differentiating the cultivated stem cells to megakaryocytes by adding differentiation factors to the cultivated aggregates comprising stem cells, e) separating the megakaryocytes from the cultivated stem cell aggregates or from the cultivated aggregates of stem cells and micro-carrier, e.g. separating the megakaryocytes from the medium containing the cultivated stem cell aggregates or cultivated aggregates of stem cell and micro-carrier, in order to obtain the megakaryocytes, f) and optionally cultivating the megakaryocytes under conditions for generating platelets from megakaryocytes, and further optionally isolating the platelets, g) and optionally irradiating the megakaryocytes and/or platelets.

In the process, the stem cells are cultivated to generate stem cell aggregates that are suspended in the medium, wherein the stem cell aggregates preferably contain a micro-carrier, and these stem cell aggregates produce megakaryocytes that are suspended, e.g. as single megakaryocyte cells, in the medium. The stem cell aggregates, optionally containing a microcarrier, upon addition of the differentiation factors in step d) generate megakaryocyte progenitor cells and then megakaryocytes as suspended single cells.

Generally, cultivation is in cell culture medium under cell culture conditions, e.g. at 37° C. in a 5% $CO_2$ atmosphere.

The process has the advantage of providing feeder cell-free and xeno-free conditions, e.g. the process does not contact, directly or indirectly, the iPSC, nor stem cells, nor the megakaryocytes, nor platelets with other cells nor with human or animal serum.

In step a), the stem cells which are at least pluripotent, preferably are induced pluripotent stem cells. Further, the stem cells which are at least pluripotent can be omnipotent or totipotent stem cells. The stem cells, especially iPSC, can originate from a biopsy, which can be a blood sample, a tissue sample, e.g. an organ sample or an isolated cell sample, possibly originating from the later recipient, i.e. patient, of the megakaryocytes or of the platelets derived from the megakaryocytes, or the stem cells can originate from another human or a stem cell line. As a further example, the stem cells can be CD34+ and/or hematopoietic progenitor cells or stem cells, e.g. umbilical cord blood cells, or a human iPS cell line.

In step a), the stem cells are e.g. seeded in cell culture plates. Generally, step a) is an amplification or expansion step of the stem cells under conditions maintaining the stem cell characteristics, e.g. without differentiating the stem cells prior to step d). Seeding in step a) is e.g. to a density of 40000 to 60000 cells per $cm^2$ plate surface. The cells can be cultivated with daily feeding with cell culture medium. The stem cells in step a) preferably are passaged when reaching confluency, e.g. 2 or 3 times per week. The stem cells preferably are cultivated under static cell culture conditions, e.g. in culture plates, which preferably are coated for adherent growth, e.g. with fibronectin or with Laminin, e.g. with human recombinant Laminin-521, which plates preferably are otherwise non-treated culture plates. The medium for cultivating the stem cells preferably is adapted for stem cell cultivation, especially for expansion of CD34+ cells, e.g. StemMACS™ iPS-Brew XF, or StemMACS HSC Expansion media XF (both available from Miltenyi Biotech GmbH, Germany), which contains recombinant cytokines and human stem cell factor, Flt3-ligand, and thrombopoietin.

Optionally, between step a) and step d), the stem cells are transferred into protein-free medium.

In step d), the cultivated stem cells (iPSC) are exposed to factors inducing mesoderm differentiation followed by their differentiation into megakaryocytes. The differentiation factors preferably are BMP4 (bone morphogenetic protein 4, e.g. added to 50 ng/mL) and VEGF (vascular endothelial growth factor, e.g. added to 50 ng/mL), both of which are preferably added both on day 0 and day 2 of step b), and additionally SCF (stem cell factor, e.g. added to 50 ng/mL), TPO (thrombopoietin, e.g. added to 50 ng/mL) and IL-3 (interleukin-3, e.g. added to 25 ng/mL) are added both on day 4 and day 8. In step b), the cultivated stem cells can be cultivated in serum-free medium, e.g. APEL2 medium (available from StemCell, Vancouver, Canada), preferably supplemented, e.g. at 5%, with protein-free hybridoma medium, e.g. PFHMII (available from Gibco Life Technologies, Darmstadt, Germany). Preferably, from day 12, the medium containing SCF (50 ng/mL) and TPO (50 ng/mL) was exchanged two times per week for fresh medium.

Step b) can be carried out with agitation, e.g. in spinner flasks.

In step c), the stem cells of step b) are cultivated to produce aggregates comprising stem cells.

In one embodiment, the iPS cells (stem cells) are cultivated as a single cell suspension to generate aggregates comprising or consisting of megakaryocytes. In this embodiment, which is less preferred, in steps b) and c), the stem cells are cultivated without the micro-carriers, i.e. in carrier-free suspension in medium. In this embodiment, the medium preferably contains ROCK inhibitor, e.g. Y-27632 (available from Calbiochem Novabiochem, Sandhausen, Germany). The medium in this embodiment may contain protein, preferably the medium is animal serum-free, e.g. protein-free. It was found that in this embodiment, the stem cells, preferably dissociated to a single cell suspension, during the cultivation form aggregates consisting of cells only. Cultivation can be with agitation, e.g. in spinner flasks, e.g. agitated at 50 rpm. In this embodiment, cultivated iPS cells were preferably seeded to $12.5 \times 10^6$ cells per 50 mL medium.

In the preferred embodiment, in step b) the iPS cells obtained from step a) are contacted with micro-carriers, e.g. the stem cells are in suspension in cell culture medium containing the micro-carriers, preferably for an initial static cultivation phase, e.g. of at least 6 h or at least 12 h, preferably of at least 24 h, more preferably of 12 to 36 h. The micro-carriers preferably are non-porous, and preferably the micro-carriers are coated with a protein promoting adherent growth, e.g. coated with fibronectin and/or human laminin, preferably recombinantly produced human laminin, to generate aggregates comprising or consisting of stem cells and micro-carriers, and it is assumed that these aggregates contain progenitor cells of megakaryocytes. The aggregates comprising or consisting of iPS cells, megakaryocyte-progenitor cells and micro-carriers have been found to release a higher number of megakaryocytes into suspension than stem cell aggregates which do not contain micro-carriers. Megakaryocytes produced from stem cell aggregates containing micro-carriers have a high capacity to produce functional platelets, also after irradiating the megakaryocytes, than stem cell aggregates without micro-carriers.

In step d), which can optionally be carried out concurrent to step c), cells generally preferably are in protein-free medium. Micro-carriers can be of polymer, e.g. of polystyrene. Generally, micro-carriers can have a size distribution in the range from 100 to 300 µm, e.g. 120 to 250 µm. Preferably the micro-carriers are coated with, e.g. have a layer of, fibronectin, preferably of laminin, preferably human recombinant laminin, e.g. Laminin-521 (LN521, available from BioLamina, Sundbyberg, Sweden). Coating of micro-carriers can be obtained by contacting sterile micro-carriers with laminin in solution, e.g. for at least 24 h at 4° C. For attachment of iPS cells to micro-carriers, the iPS cells preferably are cultivated in a static phase, i.e. without agitation of the medium, for at least 12 h, for at least 24 h, e.g. up to 48 h or up to 36 h, e.g. for approximately 24 h. The iPS cells can be used at $6.25 \times 10^6$ cells per 50 mL medium, and micro-carriers, preferably of non-porous polystyrene having a size distribution of 125 to 212 µm, can be used e.g. at 5 to 350 mg/mL.

In step c), preferably following the static phase, the aggregates comprising or consisting of iPS cells/megakaryocyte-progenitors, preferably aggregates comprising or consisting of iPS cells/megakaryocyte-progenitors and micro-carriers, are preferably cultivated for at least 19 d, e.g. for 12 to 22 d, under agitation, with exchange of the medium against fresh medium.

In the process of the invention, iPSC/megakaryocyte-progenitor aggregates, preferably in aggregates with micro-carriers, e.g. in step c), are cultivated in order to increase the numbers of megakaryocytes that are released into the culture medium. This procedure was found to generate aggregates containing stem cells, especially stem cell aggregates containing micro-carriers, wherein the proportion of megakaryocytes released into the medium increases, e.g. in relation to the number of initially seeded stem cells.

Megakaryocytes can be separated from the cultivated aggregates suspended in the medium by gravity separation, e.g. using centrifugation, or size separation, e.g. on a filtration membrane, from the supernatant of the culture.

The preferred process, which comprises cultivation of aggregates of megakaryocytes and micro-carriers, resulted in a yield of up to 42 megakaryocytes per initial iPSC, whereas the process using cultivation of iPSC as cell aggregates suspended in medium but without micro-carriers under otherwise identical conditions resulted in about 5 megakaryocytes per initial iPSC. This increase in the production level by the use of aggregates of megakaryocytes with micro-carriers (p=0.0006) shows the higher efficacy of this process.

PSC are e.g. characterized by expressing TRA-1-60 and SSEA-4 as pluripotency markers. In the alternative to PSC, totipotent or omnipotent stem cells can be used.

When the megakaryocytes produced by the process are introduced into a recipient, e.g. a patient, e.g. by injection into a vein, platelets are generated by the megakaryocytes within the recipient and can be detected in the circulation, e.g. 1 h or 2 h subsequent to introduction of the megakaryocytes into the recipient.

The step f) of producing platelets by in vitro cultivating the megakaryocytes under conditions for generating platelets, with further optionally isolating the platelets from the megakaryocytes and/or from the medium, can be under static culture conditions, e.g. plating the megakaryocytes in cell culture plates, preferably tissue culture treated plates, in medium supplemented with thrombopoietin (TPO), e.g. at 100 µg/mL. The medium for platelet production from megakaryocytes may be APEL, RPMI, or IMDM, with RPMI and IMDM, respectively, preferably supplemented with 5% AB serum (vol/vol, c.c. pro). Megakaryocytes can be cultured in this way for e.g. up to 7 days. Platelets can be isolated from the culture supernatant.

In the alternative, step f) can be performed by cultivating megakaryocytes under static conditions in one chamber of a double chamber reactor, which is separated from the other chamber by a porous membrane having 2 µm pores. After allowing the megakaryocytes to adhere to the porous membrane, medium is flowed through the other chamber, e.g. APEL, RPMI, or IMDM, supplemented with 100 ng/mL TPO and 50 ng/mL SDF-1α (Peprotech) Platelets can be isolated from the medium that was flowed through the other chamber, e.g. from 6 h to 48 h following the start of the medium flowing through the other chamber.

It was found that the megakaryocytes produced by the process comprising or consisting of steps a) to e) can be irradiated without significant reduction of their capability in generating functional platelets, e.g. in vivo after administration to a patient and/or in vitro. The step of irradiating the megakaryocytes and/or platelets produced in vitro can greatly reduce the risk of contamination by replicating nucleic acids, e.g. by prokaryotes or by a virus.

Irradiation of the iPSC-derived megakaryocytes and/or platelets can reduce the risk of teratoma formation in a recipient. Further, it was found that platelets produced according to the process comprising or consisting of steps a) to f) can be irradiated without significant reduction of their function, e.g. of their in vivo function after administration to a patient. Accordingly, the process optionally comprises the step of g) irradiating the megakaryocytes produced by the process, and/or irradiating the platelets produced from the megakaryocytes by the process.

The step of irradiating can e.g. be exposing the megakaryocytes and/or platelets to gamma irradiation for a dose of at least 5 Gy, e.g. a dose of up to 50 Gy, e.g. a dose of from 25 to 50 Gy.

Further optionally, the megakaryocytes and/or platelets produced by the process can be lysed, e.g. by at least 6 repetitive freezing (−20° C.) and thaw (37° C.) cycles to produce a lysate of the megakaryocytes and/or platelets, and the lysate can be used in the medical treatment e.g. wound healing or as a substitute of additives in cell culture, e.g. as a substitute for FCS (fetal calf serum), e.g. as a component of a cell-culture medium.

Figure 2:
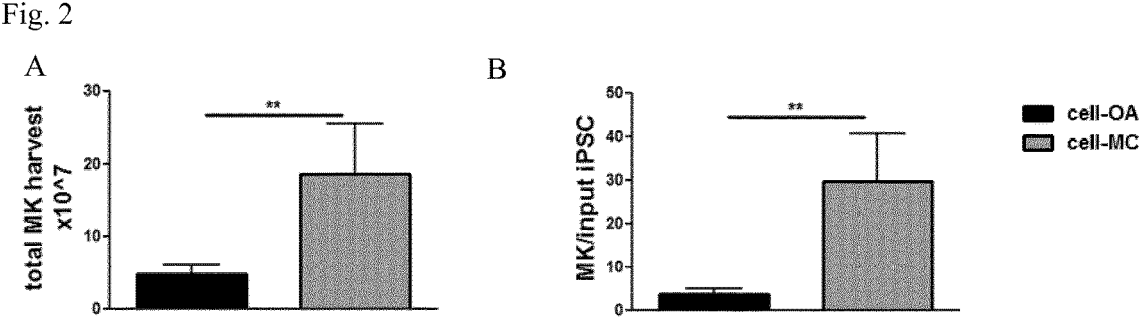
Figure 3:
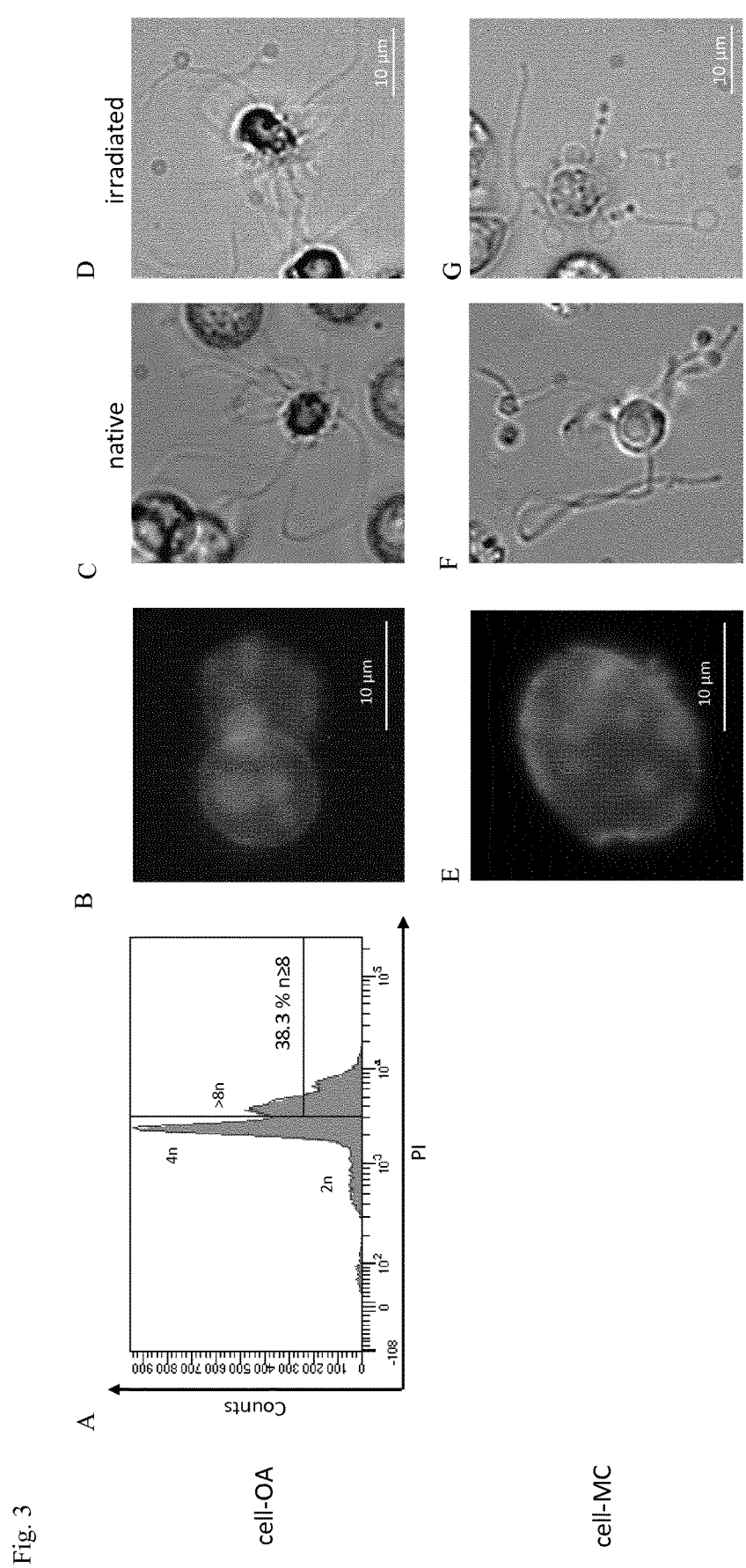
Figure 4:
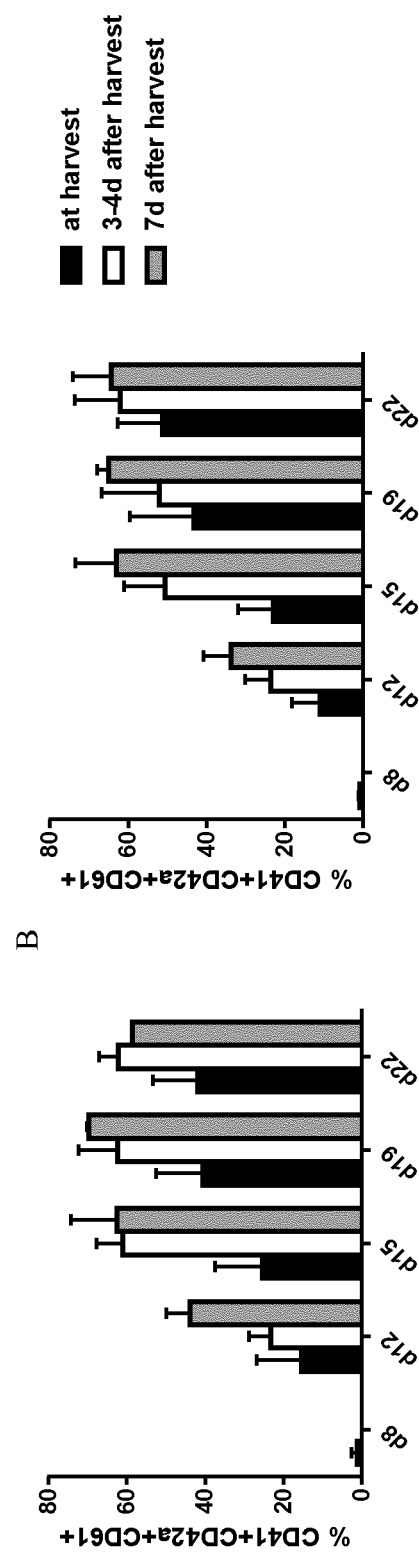
Figure 5:
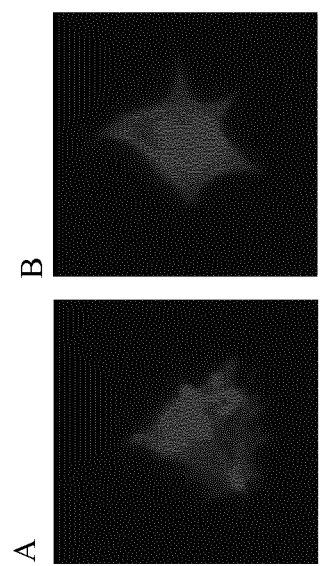

The invention is now described in greater detail by way of examples and with reference to the figures, which show in FIG. 1 micrographs of aggregates of iPSC/megakaryocyte-progenitors and micro-carriers, at A at the end of step c) and at B at the end of step d) of the process, FIG. 2 A, B graphic displays of the yield of megakaryocytes from the process, FIG. 3 at A results of flow cytometry, at B and E fluorescence micrographs, at C, D, F, G light micrographs of megakaryocyte aggregates produced in the process, without micro-carriers (upper row, B, C, D) and of aggregates of iPSC/megakaryocyte-progenitors with micro-carriers produced in the process (lower row, E, F, G), FIG. 4 A, B a graphic display of analytical results for megakaryocyte markers, and in FIG. 5 A, B micrographs of platelets produced in vitro from megakaryocytes produced according to the invention, without irradiating the megakaryocytes (A, left) or following irradiating of the megakaryocytes (B, right).

EXAMPLE 1: PRODUCTION OF MEGAKARYOCYTES USING MICRO-CARRIERS

As an example for PSC, the human iPSC line (hCBiPSC2) was cultivated in conditions without feeder cells and without serum components, giving feeder-free and xeno-free conditions. These cells were seeded at 50000 cells/cm$^2$ on 12 non-treated culture plates (Falcon by Corning, USA) coated with human recombinant laminin, LN521 (BioLamina). The iPSC were fed daily with StemMACS (Miltenyi Biotech) medium and passaged 2 to 3 times per week when confluency was reached.

In this exemplary process, the differentiation of stem cells to megakaryocytes of step b) and the preferred step c) including contacting of the megakaryocytes with micro-carriers are done concurrently. From the culture plates, iPS cells were harvested and suspended at a concentration of 6.25 cells/mL APEL and StemMACS (V/V) or only APEL medium, containing 50 ng/mL BMP4 and 50 ng/mL VEGF, both of which are added both on day 0 and day 2 of this culture. On day 4 and day 8, SCF was added to 50 ng/mL and TPO was added to 50 ng/mL and IL-3 was added to 25 ng/mL for inducing differentiation to megakaryocytes in APEL medium.

As micro-carriers, animal-product free non-porous polystyrene micro-carriers (SoloHill, PALL, Dreieich, Germany) were sterilized by autoclaving and then coated with laminin by suspending the micro-carriers in 2 µg/mL human recombinant laminin (LN521, BioLamina) in PBS buffer for at least 24 h at 4° C.

On day 0, PSC were gently mixed at a density of 12.5×10$^6$ cells per 50 mL medium with added 281.25 mg of the laminin-coated micro-carriers per 50 mL medium and incubated without agitation for approximately 24 h. During this static incubation phase, aggregates of the micro-carriers with the PSC were formed. Then, the suspension was incubated with agitation by stirring at 50 rpm in spinner flasks for at least 12 d prior to isolating megakaryocytes, with exchange of the medium for fresh medium every 2 to 3 days.

FIG. 1 shows micrographs, at A of the aggregates of the micro-carriers with the PSC on day 0, at B at day 7 of the aggregates of micro-carriers with differentiated iPSC/megakaryocyte progenitors. These pictures show that the cultivation results in a drastic increase in size of the aggregates, indicating growth of the megakaryocytes.

Megakaryocytes were isolated from the culture supernatant twice a week, starting from day 12 after the addition of the differentiation factors on day 0.

Analysis of cell size showed that these megakaryocytes had an increased cell size and polyploidy resembling that of human native bone marrow-derived megakaryocytes.

EXAMPLE 2: PRODUCTION OF MEGAKARYOCYTES USING CELL AGGREGATES WITHOUT MICRO-CARRIERS

In this example, iPSC and megakaryocytes obtained by differentiation from the PSC were cultivated as pure cell aggregates, without presence of suspended micro-carriers. hCBiPSC2 cells that were cultivated in laminin-coated culture plates as described in Example 1 were harvested and seeded into StemMACS medium. Then, the PSC were transferred to animal serum-free synthetic medium APEL (StemCell, Vancouver, Canada) supplemented with 5% protein-free Hybridoma medium II (PFHMII, Gibco by Life Technologies, Darmstadt, Germany). The PSC were incubated in spinner flasks at 50 rpm until aggregates consisting of PSC only were formed. In case, differentiation of the aggregates was observed, the ROCK inhibitor Y-27632 (Calbiochem Novabiochem, Sandhausen, Germany) was added to a concentration of 10 ng/mL medium.

On day 0 and day 2 of differentiation of the cultivated cell-only aggregates to megakaryocytes, BMP4 and VEGF were added to a concentration each of 50 ng/mL, then on day 4 and day 8 SCF and TPO were added to a concentration each of 50 ng/mL medium and IL-3 was added to a concentration of 25 ng/mL medium. From day 12 onwards, two times per week medium was exchanged for fresh medium containing the SCT and TPO, each at 50 µg/mL. Cultivation was in spinner flasks by stirring at 50 rpm.

Megakaryocytes were separated from the culture supernatant by the steps of 5 min centrifugation 800 rpm or sedimentation for 30 min.

FIG. 2 at A shows the total number of megakaryocytes and at B shows the number of megakaryocytes (MK) obtained per initial iPSC cell introduced into the process, obtained according to Example 2 (Cell-aggregates, left-hand column) and obtained according to Example 1 (Cell-MC-aggregates, right-hand column). ** denotes standard deviation p<0.01. FIG. 2 clearly shows that the process using cultivation of aggregates of micro-carriers and megakaryocytes results in a drastic increase in production of megakaryocytes, both in absolute numbers and in relation to initial numbers of PSC that were processed by the process.

FIG. 3 shows analytical results for the megakaryocytes produced according to Example 1 (Cell-MC-aggregates) and according to Example 2 (Cell-aggregates).

FIG. 3 A depicts the flow cytometric results of DNA content measurement in megakaryocytes stained with propidium iodide, showing that the megakaryocytes produced according to Example 1 had a higher DNA content compared to the megakaryocytes obtained according to Example 2. This indicates that the process using aggregates of megakaryocytes with micro-carriers generates megakaryocytes of a higher quality than the process using aggregates consisting of megakaryocytes only.

EXAMPLE 3: IRRADIATING MEGAKARYOCYTES

Megakaryocytes that were produced according to Example 1, using cultivation of aggregates of micro-carriers and megakaryocytes, were isolated from the culture medium and irradiated with 30 Gy The irradiated megakaryocytes and an aliquot of the same megakaryocytes that was separated before irradiating were used to generate platelets by cultivating the megakaryocytes under static conditions in APEL medium supplemented with 100 ng/mL TPO and 50 ng/mL SDF-la in the upper chamber of a double chamber bioreactor containing a 2 µm pore membrane for separating the lower chamber. Medium of the same composition was pumped through the lower chamber at a rate of 140 mL/min, and platelets were isolated from the medium exiting the lower chamber.

The platelets were deposited on a collagen-coated glass and analysed by microscopy after anti-CD61 staining. FIG. 5, left micrograph, shows platelets produced by non-irradiated megakaryocytes, and FIG. 5, right micrograph shows platelets produced by irradiated megakaryocytes. This results shows that functional platelets can be produced by the in vitro process from the megakaryocytes, and that the megakaryocytes can be irradiated without significantly impairing the functionality of the platelets generated by them.

EXAMPLE 4: USE OF MEGAKARYOCYTES AS A MEDICAMENT FOR REPLACING PLATELETS IN VIVO

As a representative of a human recipient patient, NOD/SCID/IL-2Rγc−/− mice were injected into the tail vein with 3×10$^6$ megakaryocytes that were produced according to Example 1 or Example 2.

After 1 h following injection of the megakaryocytes, platelets originating from the injected megakaryocytes were found.

The invention claimed is:
1. A process for producing megakaryocytes from stem cells (SC) which are pluripotent, the process comprising the steps of
  a) cultivating the pluripotent stem cells to generate cultivated pluripotent stem cells,
  b) contacting in suspension the cultivated stem cells with micro-carriers to generate aggregates comprising the pluripotent stem cells and the micro-carriers in a medium comprising bone morphogenetic protein 4 (BMP4) and vascular endothelial growth factor (VEGF),
  c) cultivating the aggregates in suspension in the medium comprising BMP4 and VEGF with agitation,
  d) differentiating the cultivated aggregates from step c) into megakaryocytes by adding stem cell factor (SCF), thrombopoietin (TPO) and interleukin-3 (IL-3) to the cultivated aggregates in suspension in the medium and cultivating with agitation for at least 8 days, said cultivated aggregates releasing the megakaryocytes into the medium and the megakaryocytes being suspended in the medium; and e) separating the released megakaryocytes from the cultivated aggregates by isolating the megakaryocytes from the medium of step d); and wherein the micro-carriers are non-porous and coated with a protein promoting adherent growth.

2. The process according to claim 1, wherein the pluripotent stem cells are induced pluripotent stem cells (iPSC).

3. The process according to claim 1, wherein step c) and step d) are carried out concurrently.

4. The process according to claim 1, wherein in step b) the pluripotent stem cells are incubated under cell culture conditions for a static phase for at least 12 hours, followed by cultivation with agitation.

5. The process according to claim 1, wherein the process is free from other cells and is free from human serum and free from animal serum.

6. The process according to claim 1, further comprising:
f) cultivating the megakaryocytes under conditions for generating platelets from the megakaryocytes, and
g) irradiating the megakaryocytes and/or the platelets.

7. The process according to claim 6, wherein step g), comprises irradiating the megakaryocytes and/or the platelets with at least 5Gy.

8. The process according to claim 6, comprising lysing the megakaryocytes and/or the platelets to generate a lysate from the megakaryocytes and/or the platelets, wherein the lysate is for use in a medical treatment.

9. The process according to claim 1, wherein the protein promoting adherent growth is fibronectin and/or laminin.

\* \* \* \* \*